United States Patent [19]

Davidson

[11] 4,340,501

[45] Jul. 20, 1982

[54] FLUID FLOW

[75] Inventor: Peter J. Davidson, Sedgefield, England

[73] Assignee: Imperial Chemical Industries Limited, London, England

[21] Appl. No.: 183,414

[22] Filed: Sep. 2, 1980

[30] Foreign Application Priority Data

Sep. 6, 1979 [GB] United Kingdom ................. 7930993

[51] Int. Cl.$^3$ ............................................... C01B 3/34
[52] U.S. Cl. ................................ 252/373; 48/214 A; 48/199 R; 423/210; 423/244; 518/715; 165/177; 422/222; 422/198; 422/202
[58] Field of Search .......... 252/373; 48/214 A, 197 R

[56] References Cited

U.S. PATENT DOCUMENTS

| | | |
|---|---|---|
| 3,433,609 | 3/1969 | Percival et al. ................... 48/214 A |
| 3,477,833 | 11/1969 | McMullin et al. ................ 48/214 A |
| 3,502,596 | 3/1970 | Sowards ......................... 252/373 X |
| 3,541,729 | 11/1970 | Dantowitz ........................ 48/214 A |
| 4,089,941 | 5/1978 | Villemin ......................... 252/373 X |
| 4,209,061 | 6/1980 | Schwemin . | |
| 4,233,187 | 11/1980 | Atwood et al. ................. 252/373 X |

FOREIGN PATENT DOCUMENTS

| | | |
|---|---|---|
| 525062 | 2/1939 | United Kingdom . |
| 805387 | 12/1958 | United Kingdom . |
| 1325745 | 8/1973 | United Kingdom . |
| 1347542 | 2/1974 | United Kingdom . |
| 1388184 | 3/1975 | United Kingdom . |
| 144604 | 8/1976 | United Kingdom . |
| 1491198 | 11/1977 | United Kingdom . |
| 1491199 | 11/1977 | United Kingdom . |
| 1491252 | 11/1977 | United Kingdom . |
| 1569828 | 6/1980 | United Kingdom . |

Primary Examiner—Howard T. Mars
Attorney, Agent, or Firm—Cushman, Darby & Cushman

[57] ABSTRACT

A process and apparatus for contacting a fluid with the walls of a vessel are characterized by flow of the fluid alternatingly (a) through a structure within the vessel and having passages angled to the general direction of flow in the vessel and (b) through a space between the structure and the vessel walls. The structure can be for example a cross flow ceramic or metal honeycomb or a stack of profiled plates or of apertured plates such as expanded metal. The structure can carry a catalytic coating and then affords high activity and low pressure drop. The process and apparatus are especially suitable for endothermic tubular steam hydrocarbon reforming.

6 Claims, 11 Drawing Figures

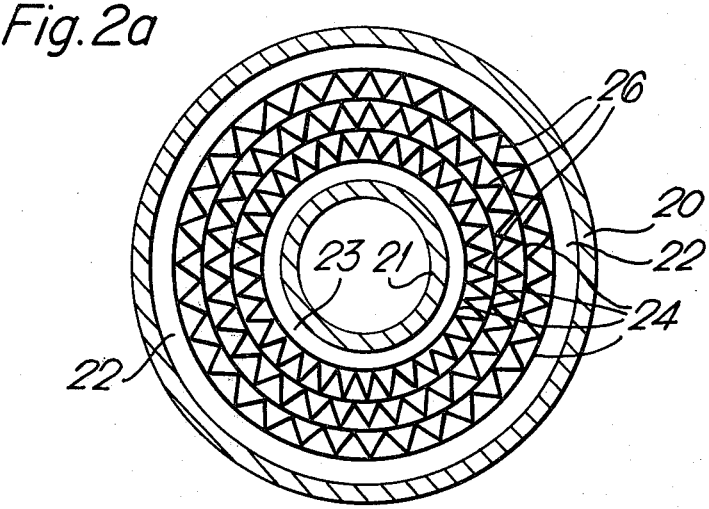
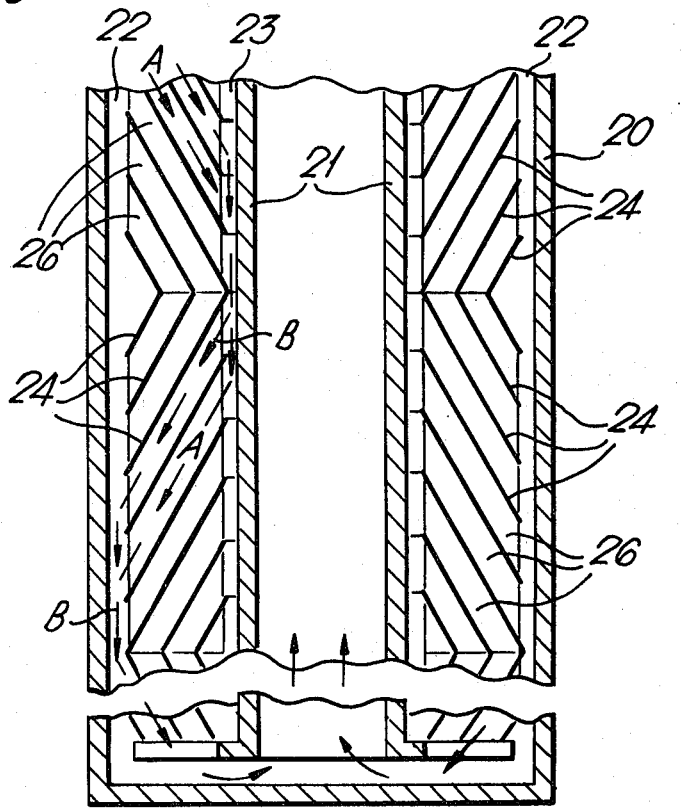

FLUID FLOW

This invention relates to fluid flow and in particular to a process and apparatus for controlling the flow of a fluid with respect to a solid surface.

In providing for flow of a fluid with respect to a solid, for example in catalytic reactions, adsorptive purification, leaching, sampling or indirect heat exchange it has been common to put the solid into a form having a large geometric surface, for example granules, honeycombs, filaments or surface fins. However, especially where there is introduction or removal of heat through the wall of a vessel this procedure is not fully satisfactory because it permits parts of the fluid to be too remote from the wall for effective heat transfer.

We have now realised that, by the use of an internal structure of a suitable shape and a suitable size in relation to the vessel in which it is contained, it is possible to bring substantially the whole of the fluid intermittently but controllably into contact with the vessel walls. As a result it is possible to obtain the smooth-flow characteristics of honeycombs with the heat transfer characteristics of particulate beds.

According to the invention a process for contacting a fluid with the walls of a vessel is characterised by causing it to flow alternatingly (a) through a structure within the vessel and having passages angled to the general direction of flow in the vessel and (b) through a space between the structure and the vessel walls.

The invention provides apparatus for carrying out the process and comprising a vessel having an inlet and an outlet and disposed therebetween an inner structure having through-flow passages angled to the general direction of fluid flow and spaced from the vessel walls so as to cause the fluid to flow alternatingly through the passages and through the space in contact with the vessel walls.

The effectiveness of the structure in providing the flow path results from balancing pressure drops respectively through the passages in the structure and through the space outside the structure and in contact with the vessel wall. Accordingly the structure or wall can be formed with projecting lugs to keep a correct spacing from the walls and, where appropriate, to deflect the flow of fluid. In order to control the pressure-drop independently of the geometric surface, the structure may carry a surface layer, possibly a multiple layer, of perforated sheet material, for example of a metal gauze. The size and frequency of the perforations can differ from region to region of the surface of the structure so as for example to equalise the flow through long and short passages. Usually the structure has a porosity, that is, ratio of passage cross-section to total cross-section, in the range 30 to 99%. The cross-sectional shape of the passages can be for example triangular, square, rectangular, hexagonal or circular. It may include one or mre re-entrant angles or curves as for example in a figure bounded by a straight line and half a sine wave. The thickness of the walls of the passages can be for example in the range 0.02 to 2.0 mm; if the vessel is tall it may be desirable to have thicker walls at the bottom, in order to support the weight of the structure.

In order to make effective use of the flow pattern the vessel has a length at least 3, preferably at least 5 times its width. The number of traverses of a path including one movement through a passage in the internal structure and one movement in contact with the vessel wall as far as the next passage entry is preferably at least 4 per vessel, more preferably over 10, for example in the range 50 to 500. The angle of the passages to the general flow direction is typically in the range 20°–80°. Usually the passages in any one region of the vessel are mutually parallel but this is not essential. The direction of the passages (superimposed on the general flow direction) is conveniently mainly chordal; in a vessel of annular cross-section it can alternatively be radial. Either may include a helical or tangential component of flow direction.

The structure is positively connected together in at least one dimension so as to prevent movement of its parts relatively to one another and to the containing vessel. Usually the structure is connected together in two dimensions (as in plates) or in all three dimensions.

Among the structures that can be used are the following:

1. ceramic honeycombs: These can be in the form of so-called "slant cell" honeycombs, which can be made by forming a block the outer walls of which are parallel or perpendicular to the internal through-passages and then cutting so that the outer walls are angled to the passages. Another usable form is the so-called "cross-flow" honeycomb in which there are two or more sets of passages, the passages in any one set being mutually parallel but angled to the passages of other sets. If the passages follow a helical or tangential path with respect to the flow direction, the honeycomb can be the product of extrusion followed by twisting of the extrudate while in a pliable condition.
2. metal honeycombs: The same geometrical variations are possible as for ceramic honeycombs.
3. plate stacks: Instead of a honeycomb, which is connected together in three dimensions, profiled plates can be stacked together without a permanent connection between them. The plates can carry surface projections high enough to keep them apart in order to form passages: the passages need not, of course, be mutually separate for all their length. In one example of a plate stack corrugated plates alternate with flat plates or with other corrugated plates having corrugations running at an angle to those of the first-mentioned corrugated plates. It will be appreciated that the plates of a stack need not be flat but could be for example sections of a helix. If the containing vessel is of annular section, the plates can be hollow truncated cones, and will then provide a radial flow path in which the fluid contacts alternatingly the outer and inner walls of the annular space.

In another example each plate is apertured so as to provide, in co-operation with the apertures of neighbouring plates, the required through-flow passages. In principle each such plate could lie in a plane oblique to the direction of flow and could be apertured to provide passages about perpendicular to its plane. More conveniently each plate lies in a plane approximately perpendicular or parallel to the general direction of flow and is apertured obliquely to its surface. Such a perpendicular arrangement requires plates of equal area for a cylindrical vessel, but the parallel arrangement requires wide plates near the vessel axis and narrow plates near the vessel walls. Very conveniently the plates can be made of expanded metal, as described further below. When, however, it is desired to provide an annular contacting vessel with centrifugal or centripetal flow or an alternation thereof, the apertures are provided without expansion if the plates are to be flat. If expansion is present, the plates are hollow truncated cones.

It will be appreciated that the term plate/disc includes members that might be regarded as dishes or bowls. Their common attribute is that they are stackable together to produce the structure. The term cone includes also an approximate hyperboloid or approximate paraboloid.

4. an insert formed externally with helical channels blocked at intervals: Unlike structures 1–3, however, this does not prevent contact with the vessel walls during flow through the passages and thus does not provide the preferred flow pattern.

Within a particular vessel the angled flow pattern can be equally angled to the general direction of flow over the whole length of the vessel. If desired, the vessel may contain successive zones in which the angle in any one zone is opposite to that of the preceding zone. In another form, the direction of the passages is equally angled to the flow direction, as compared with the preceding zone, but is displaced circumferentially about the axis of the fluid flow direction. In yet another form, the angle of the passages to the flow direction is changed in successive zones. The arrangement is appropriate when for example the process is an endothermic catalytic chemical reaction, such that at the reactor inlet the concentration of reactants and correspondingly the heat demand are high, so that contact with the vessel walls needs to be lengthy relative to the time of contact with the catalyst; and conversely towards the reactor outlet a long catalyst contact time and short wall contact time are required. Other systems in which a change of flow direction angle is appropriate can be readily envisaged by analogy.

In an advantageous vessel the structure is partitioned along radial planes and in each of the resulting sections the passages are mutually parallel but angled oppositely to the passages in neighbouring sections. By this arrangement it is possible to minimise the effect of zones of stagnation in the gas flow paths.

Owing to the mechanical properties and availability of expanded metal, this is the preferred material of the plates. The meshes formed by expansion are preferably rectangular, rather than diamond-shaped, because this makes possible a variety of configurations differing in ratio of wall contact time to structure contact time. The extent of expansion, as compared with the starting sheet material is suitably up to 60%, depending on the angle of the apertures to the general plane of the plate, which angle is typically in the range 80° to 20°. The apertures, if rectangular, typically are 5–100, especially 10–50, mm in length and 2 to 10 mm in width for a wide variety of gas contacting operations, especially catalysis. The metal thickness is suitably in the range 0.02 to 2.0 mm. The over-all thickness of each plate as expanded is suitably in the range 10 to 50 mm. The plates in a stack need not, of course, be identical.

It is possible to provide the apertures without expanding the metal sheet or even with shortening by, for example, up to 30%. Such apertured sheets can be used in the apparatus according to the invention.

The mutual disposition of the plates provides several possibilities. In the simplest, each aperture in a given plate is directly in line with a similar aperture in neighbouring plates, thus providing minimally obstructed flow passages and minimal access from one passage to the next. For this arrangement each plate may be so positioned relative to its neighbours as to prevent nesting of the aperture walls of one plate into the apertures of the next and thus bifurcating the flow path. Such a nested arrangement may, however, be desirable when longer contact times are required. In an intermediate arrangement the short walls of the apertures of one plate lie over an intermediate point, typically the centre, of the length of the apertures of the neighbouring plate. This arrangement provides for access between passages but without the obstruction of flow resulting from the nested arrangement. It also can increase the mechanical strength of the plate stack, thus permitting the use of thinner metal.

When successive plates are not mutually nested they are provided with means such as tie-rod holes or spigots and sockets to maintain the required mutual disposition. If desired, successive plates can be locally welded together. Conveniently the plates are brought together in assemblies, of 10 to 100 for example, before being charged to the contacting vessel. Each such assembly is held together by tie-rodding or welding and its disposition with a neighbouring assembly maintained demountably. The number of plates in one assembly is typically such as to provide 1 to 10 complete flow paths from the inlet to the outlet of the structure. At intervals along the length of the vessel there can be a grid of material, typically more open than the plates and perforated perpendicularly to its plane, having means to position it with respect to the plates and having projections to position the plate structure with respect to the vessel walls. These grids conveniently are placed between plate assemblies, but may occur within assemblies or at intervals of more than one assembly. By the use of such grids it becomes unnecessary to provide the plates themselves with projections.

In an assembly especially suitable for long vertical vessels the tie rod or rods are thick enough, taking into account thickness, cross-sectional shape and lateral restraint by the plates, to resist flexure in compression. Then the weight of plates in higher assemblies in the vessel is carried by the tie rods, not by the lower plates, which carry only the weight above them in their assembly. Consequently plates of thinner metal can be used and the geometric surface of the assembly can be increased. If a radially partitioned structure is used, the partitions can be integral with the tie rod or rods and thus support part of the weight.

The invention includes also a process and apparatus in which the structure, in addition to being a flow guide, also acts chemically or catalytically on the flowing fluid or one or more constituents thereof. In addition, or instead, a chemically active or catalytically active coating on the walls of the vessel or on other surfaces such as of the perforated sheet material mentioned above may be used.

The invention provides in particular a process and apparatus for steam reforming hydrocarbons in which the fluid comprises steam and a gaseous or vaporised hydrocarbon and the structure is a steam reforming catalyst. Such a catalyst comprises a ("primary") support material, for example a ceramic or a metal, carrying a catalytically active metal and possibly also a layer of oxidic material ("secondary support"), the function of which is to provide a large adsorptive surface and thus improve the catalytic activity of the metal.

The primary support can comprise, for example, alumina, aluminosilicate, magnesia-alumina spinel, calcium aluminate cement, cordierite and combinations thereof such as are used in catalyst manufacture. If it is a metal, it should of course be resistant to the conditions of the reaction, or be made resistant by a coating, for example, of an oxide such as ceria. Very suitably the primary support is a metal or alloy capable of forming an outer layer of insoluble difficultly reducible oxide: "difficultly reducible" oxides include chromium and elements above chromium in the electromotive force series of the elements, a selection from which is set out on page 1521-3 of Handbook of Chemistry and Physics 32nd Edition.

Thus the supports that may be used can be for example titanium, zirconium and their alloys containing up to 10% other metals.

Preferably the support comprises iron and at least one other metal capable of forming an oxide layer effective to inhibit corrosion of iron. For processes at temperatures up to 750° C. stainless steels, including ferritic steels, containing at least 12% of chromium (such as defined in ASTM specification 430) are generally suitable. For processes at up to 850° C. it is preferred to use an austenitic stainless steel containing 16–20% of chromium, 6–10% nickel and also minor constituents such as titanium or molybdenum, for example as defined in ASTM specifications 304, 316 and 321. For the generality of processes, including especially the steam hydrocarbon reaction at up to 1000° C., the preferred catalyst support is a high temperature alloy containing 20–30% of chromium, 15–40% of nickel, balance minor constituents and iron. Such alloys commonly have an austenitic structure. One example of such a preferred catalyst support is "alloy 800H", also known as INCOLOY (RTM) 800H and as UNS N-08810, as defined in ASTM specification 8407-77, the composition % of which is

| Ni | 30–35 |
| Cr | 19–23 |
| Fe | at least 39.5 (by difference) |
| Mn | not over 1.5 |
| C | 0.05–0.10 |
| Cu | not over 0.75 |
| Si | 1.0 |
| S | not over 0.015 |
| Al | 0.15–0.60 |
| Ti | 0.15–0.60 |

Another is alloy 800 (UNS N-08810), defined in the same specification, which may contain less carbon. Yet another is "INCOLOY DS" (RTM) which has the % composition 18 Cr, 37 Ni, 1.5–2.5 Si, not over 0.15 C.

If desired, an alloy of still higher nickel content, including those containing over 70% of Ni, balance minor constituents and chromium, such as NICHROME or INCONEL (RTMs) can be used, but for most purposes are considered too expensive.

Further alloys that can be used, but which show somewhat inferior mechanical strength in the most severe conditions encountered, are those containing 0.5 to 12% of aluminium and 0.01 to 3% of yttrium, and possibly up to 25% of chromium. These alloys include those developed for oxidative conditions at high temperature encountered in the nuclear power industry.

Examples of useful alloys are the following:

TABLE 1

| Aluminium | Chromium | Yttrium | Others | Iron |
|---|---|---|---|---|
| 0.5 to 12 | up to 20 | 0.1 to 3 | — | balance |
| 0.5 to 12 | 5 to 15 | 0.1 to 3 | — | balance |
| 4 to 6 | 5 to 15 | 0.1 to 3 | — | balance |
| 4 to 12 | 20 to 25 | 0.1 to 3 | — | balance |
| 4 to 5.5 | 20 to 25 | 0.1 to 0.5 | — | balance |
| 2 to 12 | 10 to 25 | 0.01 to 0.1 | — | balance |
| 4 to 5.5 | 15 to 22 | 0.01 to 0.1 | — | balance |
| 4.5 | 22.5 | — | 2.0 Co, 0.1 C | balance |

The support alloy may contain, in substitution for part of the iron balance up to 5.0, for example up to 3.0% of nickel and/or cobalt. Although such nickel and/or cobalt may exert some catalytic effect, nickel and/or cobalt in a coating active as a steam reforming catalyst is additional thereto.

Among the usable alloys are the steels available under the trade names FECRALLOY and KANTHAL (both RTM).

The presence of chromium, aluminium or silicon or more than one of these is believed to account for their property of bonding oxidic catalyst support material, especially alumina, at their surface. In addition they are characterised by high creep strength and high resistance to oxidation and carburisation, both of which properties are very desirable in a material intended to withstand the conditions prevailing in the steam/hydrocarbon reaction.

It will be appreciated that, since a catalyst support must have a relatively high geometric surface area and must thus be fabricated from metal or alloy of thin gauge, the alloys to be used are those within the above definitions that are available in wrought form.

It is also possible to use a metal or alloy that is not itself resistant to the reaction conditions but has been rendered resistant by a coating, for example of an oxide such as ceria. Suitable alloys are low chromium steels (up to 11% Cr), possibly containing molybdenum (0.5 to 1.5% w/w).

The secondary support, if present, can comprise for example magnesia, lime, alumina, silica, titania, zirconia, hafnia, thoria or compounds or combinations thereof. Such material preferably has a surface area in the range 0.5 to 250 m$^2$/g.

The active metal in steam reforming processes is most commonly nickel, cobalt being almost equivalent but much less often used in industry. These metals are suitably present to the extent of 0.2 to 25, especially 0.5 to 5.0% w/w calculated on the constituents non-volatile in air at 900° C. of a catalyst precursor in which they are present as monoxides.

In addition to catalytic nickel and/or cobalt, there may be present one or more platinum group metals, which are capable of increasing the activity of the nickel and/or cobalt and of decreasing the tendency to carbon lay-down when steam reforming hydrocarbons higher than methane. An alkali metal compound may be present in order to decrease the tendency to carbon lay-down.

Since the catalyst can have a high geometric surface but a relatively small adsorptive surface, the active metal is readily accessible to the reactants. Therefore the catalytic metal is very suitably one or more platinum group metals, especially Ru, Rh, Pd, Ir, or Pt. The steam reforming activity of such metals has been disclosed before, but they have been little used on the highly adsorptive supports previously common in steam reforming catalysts.

The invention provides a steam reforming tube charged with a catalyst in the form of the structure providing the above defined flow path. A convenient catalyst is in the form of elliptical plates having their minor diameter slightly less than the diameter of the steam reforming tube. (Such a tube is normally of circular cross-section but the analogous shape can be readily envisaged for oval-section tubes such as have been proposed). A preferred catalyst is in the form of expanded metal.

Whereas most steam reforming tubes in use are of the single-pass type, the invention is suitably used in a tube of the double-pass type, in which an inner, usually axial, tube is present, the catalyst is in the space between the outer and inner tubes, and the reactants after passing through the catalyst are withdrawn by way of the inner tube. For such a tube the catalyst structure is formed with a central hole, which will be elliptical if the stacked plate form is used and will be large enough to permit the gas to flow in contact with the inner tube. For this type of tube the catalyst can be in the form of radial-flow honeycombs or stacked truncated cones, suitably smooth with separating projections or smooth alternating with corrugated. Such honeycombs or cone-stacks should be arranged in zones providing alternating centripetal and centrifugal flow. In a double-tube steam reforming tube the inlet and outlet are preferably uppermost and the inner tube is formed with means, for example one or more toothed flanges, to support the catalyst units. Then the catalyst can be charged or discharged by inserting or lifting out the inner tube.

The invention provides also a steam reforming furnace comprising a refractory-lined chamber, a plurality of the steam reforming tubes suspended therein and a plurality of burners providing radiative and convective heat transfer to the tubes.

In a steam reforming process according to the invention the temperature pressure and steam ratio should be such that the over-all chemical reaction is endothermic. Typically the catalyst outlet temperature is in the range 600° to 1000° C., the pressure in the range 5 to 100 bar abs. and the steam ratio (mols of steam per atom of carbon) in the range 2 to 8. The tube has an internal diameter suitably in the range 40–150 mm, especially 50–120 mm. If an internal tube is used, its external diameter is suitably over 20 mm, but in this event the outer tube should be wide enough to allow at least 10 mm between the inner and outer tubes. The catalyst is of course narrower than the tube internal diameter or the space between the tubes, in order to allow for gas flow in contact with the tube walls.

The following other applications of the contacting process and apparatus are among those envisaged:
1. desulphurisation of gases, using a structure coated with oxide of zinc, iron or manganese;
2. methanation of gases containing carbon oxides and hydrogen, using a structure carrying nickel, cobalt or ruthenium as catalyst. When the methane content of the gas is to be increased by more than 5% v/v this process is strongly exothermic and the flow path provided by the invention permits highly effective heat removal;
3. catalytic oxidation;
4. heat exchangers in general. The effect of the internal structure is to increase the heat transfer co-efficient to an extent comparable with what is achieved by external fins or by the use of internal tubulators such as "Kenics" mixers. An example of a heat exchange duty for which the invention is suitable is the boiler feed water heater in the process gas line from a steam reforming process.

The invention includes also the component parts of the apparatus, which are believed to be new articles, in particular elliptical plates as described and stacks thereof;
truncated cones as described and stacks thereof;
assemblies of expanded metal as described;
honeycombs with helical or tangential flow component;
any of these carrying a coating of chemically active, catalyst supporting or catalytically active material.

The invention is illustrated by the accompanying drawings in which:

FIG. 2 represents sectionally (a) in plan and (b) in elevation a fluid contact vessel according to the invention and having a contacting space of annular cross section;

Figure 1A:
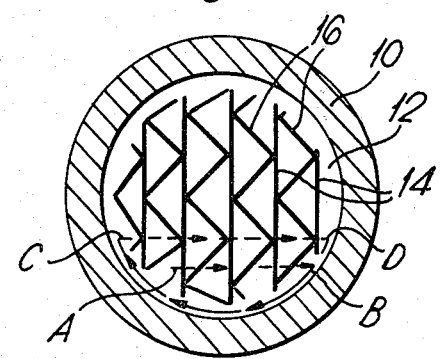
FIG. 1 represents sectionally (a) in plan and (b) in elevation a cylindrical fluid contact vessel according to the invention. In (a) all the gas flows and in (b) the gas flows BC and from D have a directional component perpendicular to the plane of section.
Figure 1B:
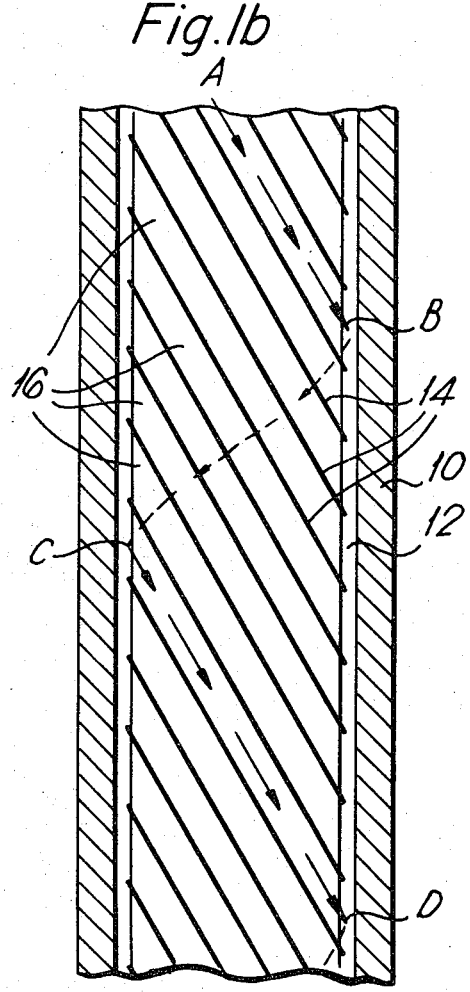

In FIG. 1 the outer shell 10 of the vessel has, immediately next to its inner wall, space 12 which is empty except possibly for spacing lugs (not shown) which could be formed on the inner wall but are more conveniently formed on the inner flow guide structure and have the function of maintaining the correct distance between the wall and the structure. The structure consists of elliptical flat plates 14 alternating with elliptical corrugated plates 16. The plates are shown as incompletely filling the spaces between plates 14, but in practice the nodes of the corrugations are in line-contact with the flat plates and may, indeed, be secured thereto by welding or riveting. The discs are set at an angle of about 30° to the general flow direction. To avoid excessive weight on the lowermost discs the plates can be present as vertically separate assemblies, each held together by a weight-bearing tie-rod. The gas flow direction, shown by the pecked line and arrows includes, in succession, the two components:

A to B: through the passages between flat plates 14 and corrugated plates 16; followed by B to C: on emerging from those passages, through space 12 in contact with the vessel walls until the openings of further passages are encountered.

Then the component C to D repeats A to B further down the vessel. Some of the fluid re-enters the passages between B and C. The fluid undergoes effective mixing in space 12. On average the total lengths over which gas contacts the surfaces of the guide structure and walls in a particular vessel are equal for all starting points, since each includes both long and short distances through the structure.

In FIG. 2 the vessel is bounded by outer wall 20 and inner wall 21. By the aid of spacing lugs (not shown), space 22 is maintained between the guide structure and outer wall 20 and space 23 between it and inner wall 21. The structure consists of smooth truncated hollow cones 24 alternating with analogous corrugated members 26 and, as in FIG. 1, these are mutually in line contact and may be secured together. The passages in the structure have a radial component of flow direction and accordingly the structure is subdivided into a number of sections providing in succession:
  A: centripetal flow;
  B: flow in contact with inner wall;
  $A^1$: centrifugal flow; and
  $B^1$: flow in contact with outer wall.
Outer tube 20 is closed at its lower end, so that fluid returns upwards in tube 21.

In an alternative form of contact vessel having a central tube the guide structure consists of elliptical plates lying parallel as in FIG. 1 but formed with a central elliptical hole providing a space about the central tube.

In either type of apparatus according to FIG. 2, central tube 21 is formed at its bottom with a toothed flange holding up the guide structure and enabling it to be lifted out of tube 20 when required.

The vessels shown in FIGS. 1 and 2 can be simply heat exchangers, in which event the flow guide structure improves the heat transfer co-efficient. A preferred use of either vessel is as a steam-hydrocarbon reformer tube in which heat is taken in from outside the tube to effect a strongly endothermic chemical reaction. For this purpose the guide structure carries a layer of catalyst, for example nickel on alumina. The flow pattern then provides for steps of effective heating of the reactants in contact with the walls followed by steps of endothermic reaction in contact with the catalyst.

In two typical steam reforming tubes according to FIG. 1 the following dimensions are suitable:

|  | I | II |
| --- | --- | --- |
| Tube internal diameter mm | 100 | 60 |
| Distance between flat discs mm | 4 | 1.2 |
| Width of space 12 mm | 4.3 | 1.25 |
| Thickness of discs mm | 1.0 | 0.51 |

The pressure drop through tubes I is about one-tenth that of an analogous tube charged with pelleted catalyst. Tubes II contain more catalyst than tubes I but still have a lower pressure drop than particulate catalyst. Using tubes II fewer tubes are needed and hence a substantial economy in plant capital costs is possible.

In a double pass reformer as in FIG. 2 but with elliptical plates:

| | |
| --- | --- |
| Tube 20 internal diameter mm | 63 |
| Tube 21 external diameter mm | 25 |
| Distance between flat discs mm | 1.74 |
| Width of space 22 mm | 1.25 |
| Width of space 23 mm | 1.0 |

| | |
| --- | --- |
| Thickness of discs mm | 0.31 |

Figure 3A:
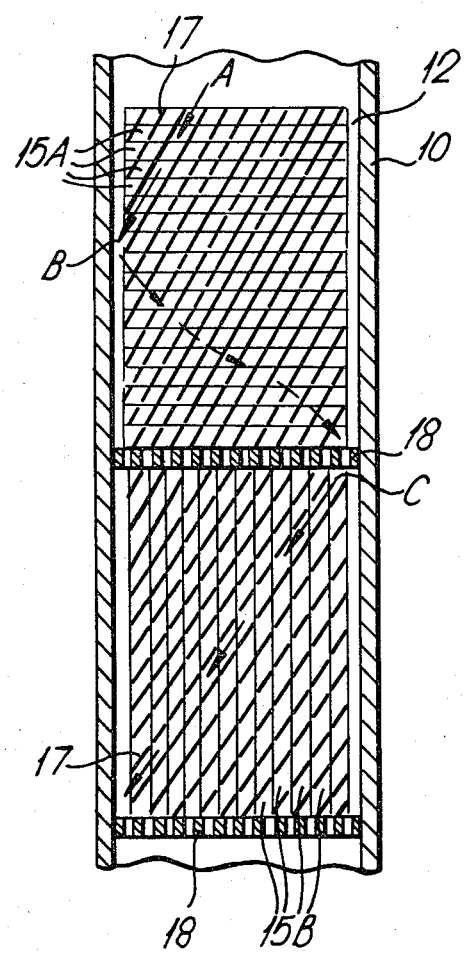
FIG. 3a is a sectional elevation of a cylindrical fluid contact vessel according to the invention and having an internal structure formed of expanded metal. Gas flow BC has a directional component perpendicular to the plane of section.

In FIG. 3a the outer wall 10 of the vessel has, immediately next to its inner wall, space 12 which is empty except possibly for spacing lugs (not shown) which could be formed on the inner wall but are more conveniently formed on the inner flow guide structure as horizontal extensions from all or some—for example one in every five—of expanded metal plates 15 A and B. Plates 15 A are shown horizontally, plates 15 B vertically, stacked together so that their strands 17 are coplanar; the plates are maintained in this mutual disposition by means not shown, such as spot welding or vertical tie-rods. In an alternative arrangement, two types of plate 15 are used in alternation, with mesh shapes and sizes chosen so that plates 1, 3, 5 etc are kept in correct disposition by plates 2, 4, 6 etc, and plates 2, 4, 6 etc by plates 1, 3, 5 etc. In a further alternative, in which freedom of flow is less important but mixing and contact are to be favoured, successive plates 15 may be allowed to nest together. Plates 15 are, in any event, fixed together in groups suitably of 15–20 and each group is separated by grid 18. The gas flow direction, shown by the dotted line and arrows, includes in succession the two components:
  A to B: through the passages defined by strands 17 of plates 15; followed by
  B to C: on emerging from these passages, through space 12 in contact with the vessel walls until the openings of further passages are encountered.

Instead of grids 18 the assemblies of plates 15 A or 15 B can be held together by vertical tie-rods which both hold the plates together and transmit the weight of the assemblies to a support at the bottom of the vessel.

Figure 3B:
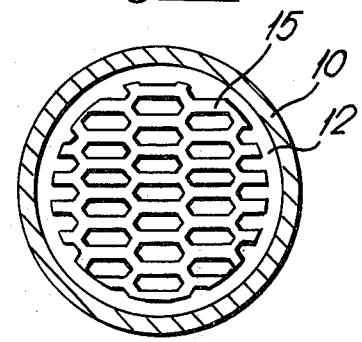
FIG. 3b is a vertical plan view of the FIG. 3a vessel, but with the internal structure drawn to a magnified scale, for the sale of clarity.
Figure 3C:
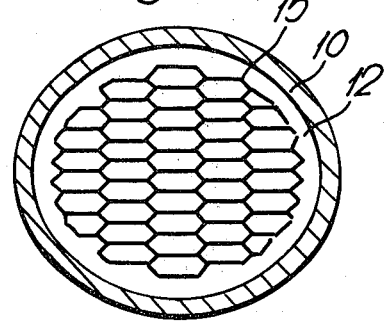
FIG. 3c is an oblique plan view of the FIG. 3a vessel, but with the magnified internal structure scale.

FIGS. 3b and 3c show how the passages are constituted by plates of parallel-strand expanded metal. The line of sight for the oblique plan view in FIG. 3c is the direction of flow path AB shown in FIG. 1.

Figure 3D:
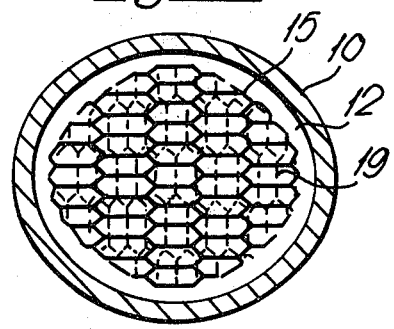
FIG. 3d is a view, in the same oblique direction as in FIG. 3c, of a modified vessel, again with the magnified internal structure scale.

In the modified vessel shown in FIG. 3d plates 15 are individually identical but are stacked so that the strands of plates 1, 3, 5 etc are mutually parallel but are perpendicularly disposed to plates 2, 4, 6 etc. (Plates 2, 4, 6 etc are indicated by a dotted outline, with reference numeral 19). In such a vessel the gas is deflected through a right angle each time it passes through a plate, but its over-all direction of flow is still from space 12 at one level to space 12 at another level. This arrangement ensures that successive plates do not nest together and provides especially long contact times within the guide structure. If desired an angle between successive plates of less than a right angle could be used.

If the vessel is a steam-hydrocarbon reformer tube, the plates carry a layer of catalyst, for example nickel on alumina. In a typical steam reforming tubes the following dimensions are suitable:

| | |
| --- | --- |
| Tube internal diameter, mm | 100 |
| Width of space 12, mm | 3 |
| Distance between strands in plane of plate, mm | 5 |
| Overall thickness of plate perpendicular to its plane, mm | 3 |
| Thickness of plate metal, mm | 0.3 |

Figure 4A:
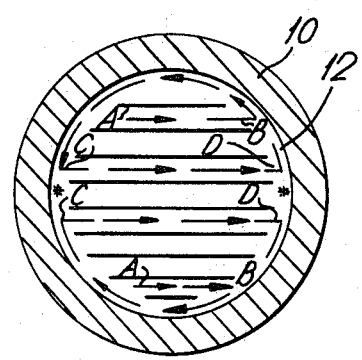
FIG. 4 shows in plan at (a) the essential flow pattern of the vessels of FIGS. 1 and 3 to 6 and at (b) and (c) two alternative flow patterns.
Figure 4B:
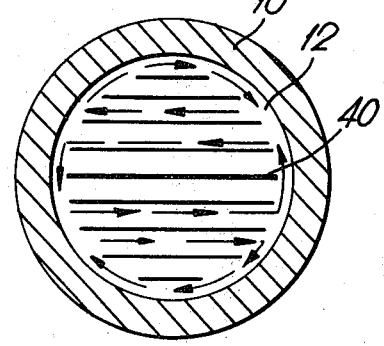
Figure 4C:
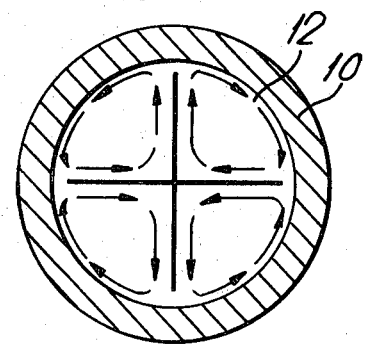

In FIG. 4a, which represents schematically the flow pattern of FIG. 1a it is evident that on leaving the passages the gas flow bifurcates, leaving a zone of stagnation shown by an asterisk. In FIG. 4b a different structure is used, in which the passages are mutually parallel in each half-cylinder, but in one half-cylinder are angled oppositely to those in the other half. The two halves are separated by diametral plane position 40. There is now a short path from the outlets of passages in one half-cylinder to inlets in the other half-cylinder and thus less significant zones of stagnation arise. FIG. 4(c) shows the extension of this principle to 4 quarter-cylinders.

I claim:

1. A process for reacting steam with a gaseous or vaporized hydrocarbon in endothermic conditions flowing over a steam reforming catalyst at a catalyst outlet temperature in the range 600°–1000° C. in a vessel having heated walls, the steam reforming catalyst being in the form of a structure spaced from the vessel walls with through passages angled to the general direction of flow in the vessel, comprising the steps of flowing the reactant mixture alternating (a) through the passages in the catalyst and (b) through the space between the catalyst structure and the heated vessel walls.

2. A process according to claim 1 in which a component of the direction of flow through the passages is chordal to the cross-section of the vessel.

3. A process according to claim 1 in which the vessel is annular in cross-section and direction of flow through the passages is alternatingly outwardly and inwardly.

4. A process according to claim 1 in which the steam reforming catalyst comprises a stack of profiled plates.

5. A process according to claim 4 in which each plate is apertured so as to provide, in co-operation with the apertures of its neighbouring plates, the required through-flow passage.

6. A process according to claim 1 in which the steam reforming catalyst is partitioned along radial planes and in each of the resulting sections the passages are mutually parallel but angled oppositely to the passages in neighbouring sections.

* * * * *